United States Patent [19]

Hannan, Jr.

[11] 4,254,157
[45] Mar. 3, 1981

[54] PROCESSING OF GRAPEFRUIT SEGMENTS CONTAINING MEMBRANES

[75] Inventor: Harry Hannan, Jr., Orlando, Fla.

[73] Assignee: Citrus Central, Inc., Orlando, Fla.

[21] Appl. No.: 53,382

[22] Filed: Jun. 29, 1979

[51] Int. Cl.³ ............................................. A23B 7/00
[52] U.S. Cl. .................................. 426/616; 426/407; 426/518
[58] Field of Search ............... 426/616, 131, 106, 615, 426/397, 407, 518, 520, 521

[56] References Cited

U.S. PATENT DOCUMENTS

Re. 27,646  5/1973  Cohen .................................. 426/616
3,592,664  7/1971  Verlin .................................. 426/407

Primary Examiner—Joseph M. Golian
Assistant Examiner—Elizabeth J. Curtin
Attorney, Agent, or Firm—Duckworth, Hobby, Allen & Pettis

[57] ABSTRACT

A method, and the product rendered by the method, for processing citrus fruit to tenderize the intermediate membrane between adjacent fruit sections includes heating canned citrus sections containing membranes to an elevated center can temperature in order to tenderize the membrane, but in which the cooking process is insufficient to appreciably damage the juice sacs in the fruit sections adjacent to the membrane.

3 Claims, 3 Drawing Figures

PROCESSING OF GRAPEFRUIT SEGMENTS CONTAINING MEMBRANES

BACKGROUND OF THE INVENTION

I. Field of the Invention

The present invention relates to methods for preparing food products, and in particular, relates to methods for canning citrus segments or membranes containing citrus sections, such as grapefruit.

II. Description of the Prior Art

Citrus fruit products are made commercially available in numerous forms, including fresh, canned and concentrated juice; fresh whole fruit; as well as both glass packed and canned fruit sections. Citrus sections as well as other processed citrus products are available in different container sizes.

In the preparation of citrus fruit sections for canning, it is first necessary to remove the outer skin or peel. This may be done in a conventional manner by heating, mechanically or by hand removing the peel followed by a lye bath and water rinse.

Citrus fruits, notably oranges and grapefruit, have a membrane separating adjacent fruit sections. In the case of grapefruit, this membrane is quite tough, having a strength of about twenty-five (25) ounces (measured by cross sectional stress on the membrane by an Altek Tensil Tester). To render the fruit sections palatable, the fruit sections must be separated, usually by hand, or by a machine to remove the sections from the membrane. This process is quite labor-intensive with a low yield, which increases production costs. A good description of the sectionizing process is set forth in the United States Department of Agriculture Handbook entitled "Chemistry and Technology of Citrus, Citrus Products, and By-Products", Agriculture Handbook No. 98, revised 1962, in particular see pages 30–33.

Further, the United States Department of Agriculture has established certain standards and grades for canned and bottled citrus fruit. See, for example, "United States Standards for Grades of Canned Grapefruit" 6th Issue, effective Oct. 25, 1973, established by the U.S. Department of Agriculture, Agricultural Marketing Service, Fruit and Vegetable Division (Processed Products Standardization and Inspection Branch); and see, "United States Standards for Grades of Canned Grapefruit and Orange for Salad", Third Issue, effective Apr. 8, 1975, U.S. Department of Agriculture, Agricultural Marketing Service. The hand sectioning method described above tends to render the fruit sections non-uniform in addition to increasing the overall costs of the finished product. Further, in the case of grapefruit, the physical handling of the fruit during the removal of the sections from the membrane tends to destroy the juice sacs, thus rendering an end product which is very fragile.

In U.S. Pat. No. 3,396,040 (now U.S. Pat. No. Re. 27646), Cohen discloses a process for preserving citrus fruit products by pressure cooking after the fruit has been sectionized and placed in a glass container.

Other prior art of interest includes the following:

U.S. Pat. No. 2,930,706 to Moulton; a phamplet entitled "By-Products and Speciality Products of Florida Citrus", by J. W. Kesterson, et al, from the Agricultural Research and Education Center, Lake Alfred, Florida; a book entitled *Commercial Fruit and Vegetable Products*, by W. D. Cruess, 3rd Edition, 1948, McGraw-Hill Book Co., Inc., New York.

In the canning of citrus sections as described above, it is conventional to elevate the center can temperature to about 168°–171° F. in order to preserve the fruit.

SUMMARY OF THE INVENTION

The present invention contemplates a method, and the resulting fruit product, for processing citrus fruit to tenderize the intermediate membrane between adjacent fruit sections. The method includes the step of removing the peel of the citrus fruit and treating the peeled fruit with sufficient heat to tenderize the membrane, but in which the processing and heat is insufficient to appreciably damage the juice sacs in the fruit sections adjacent to the membrane.

In accordance with the present invention, preparation of the citrus fruit for use in this process includes removal of the entire outer peel of the fruit, and thereafter slicing or sectionizing of the fruit through the sections comprising the juice sacs, and intermediate between adjacent membranes, thus leaving the membranes intact during further processing. The fruit sections containing the membranes are then placed in an appropriate container, preferably a metal can, and the fruit is further processed to tenderize the membrane without destruction of the juice sacs contained in the attached portions. The resulting product with the juice sacs attached to the tenderized membrane is able to withstand much more abuse and rough handling than conventionally canned citrus sections.

In accordance with one specific embodiment of the present invention, this treatment step includes the heating of the containerized peeled fruit sections to a center temperature in a range of between about 200° to 223° Fahrenheit to effect a tenderizing of the membrane to a strength of substantially less than ten (10) ounces as measured by an Altek Tensil Tester.

The resulting food product comprises uniform portions of grapefruit sections containing tenderized membranes.

THE DRAWING

DETAILED DESCRIPTION

Figure 1:
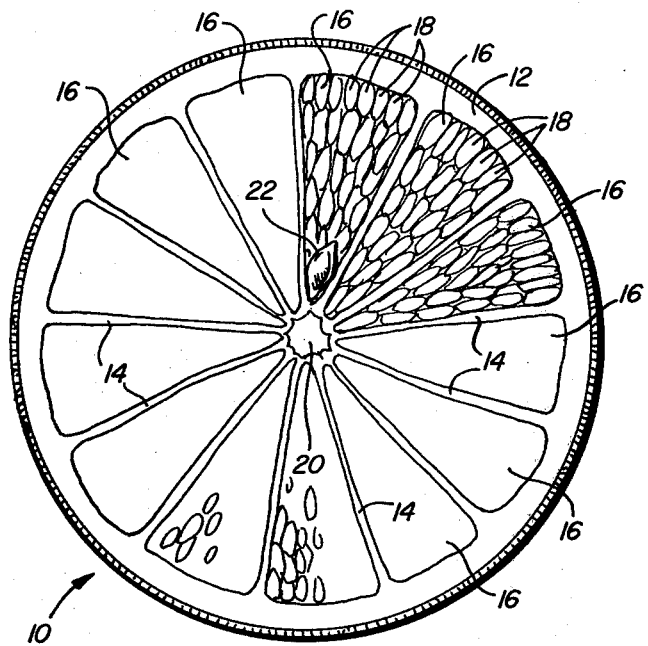
FIGS. 1 and 2 illustrate cross-sections of a citrus fruit depicting certain steps according to the process of the present invention.

Noting FIG. 1, there is shown a cross-section of a citrus fruit, which, for example may comprise grapefruit. The fruit, referred to by the reference numeral 10, includes an outer peel 12 with a segment membrane 14 separating adjacent juice sac-containing segments 16. Each segment 16 includes a plurality of cellular juice sacs 18, as is well known. The fruit also contains a central core 20 connected to all of the membranes 14, and may include seeds therein, although certain varieties of citrus fruits are seedless.

Figure 3:
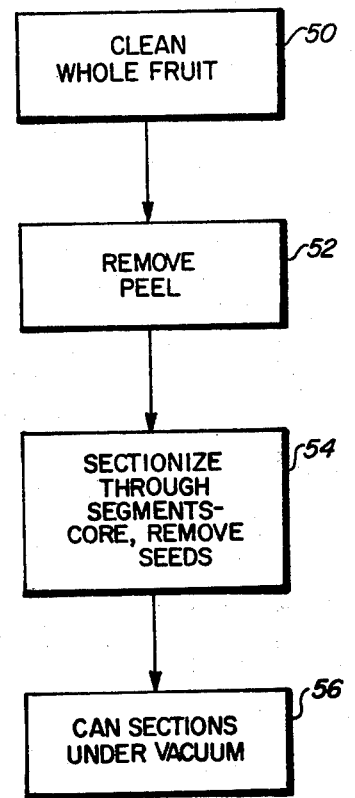
FIG. 3 is a block diagram illustrating the sequence of steps according to the process of the present invention.
Figure 3:
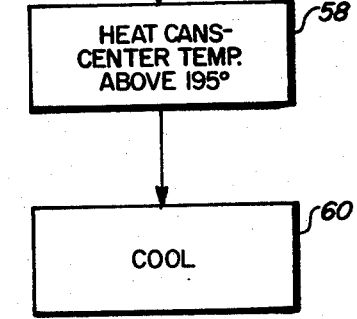

Reference is now made to FIG. 3. As shown in the first step, identified by the reference numeral 50, whole fruit is first cleaned thoroughly. The fruit is then treated, as shown in step 52, to remove the peel. As described above, this may be accomplished in a conventional manner.

Figure 2:
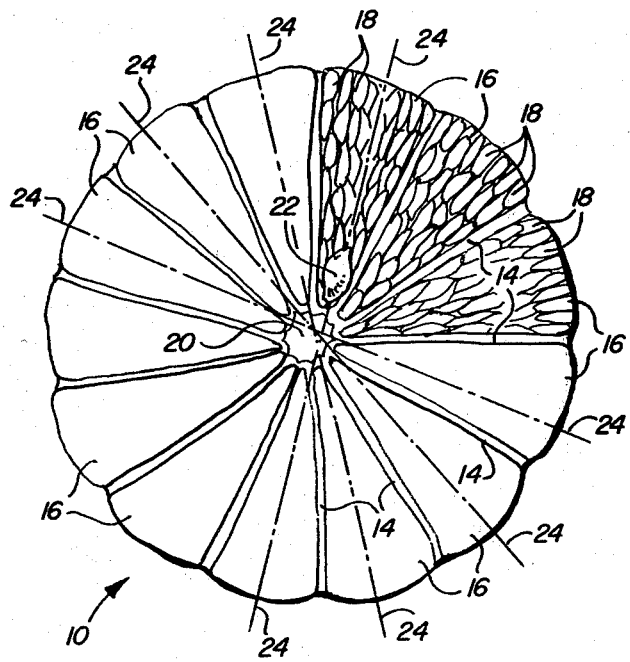

The whole fruit 10 with the peel removed is shown in FIG. 2. As is shown in step 54 (FIG. 3), the next step is to core the fruit, so as to remove the core 20 and a majority of the seeds 22.

Thereafter, in accordance with the present invention, each juice segment 16 is severed along lines 24 between adjacent membrane 16, as shown by the dotted lines in FIG. 2. Each resulting section includes a portion of a juice segment on either side as a membrane which is roughly in the center of that section, each section being defined by that portion of the fruit between adjacent sectionizing lines 24 in FIG. 2. Typically, grapefruit will have thirteen segments 16. Accordingly, it is sometimes necessary to cut the fruit 10 along the lines 24 in such a way that two membranes 14 are within one cut section.

As shown in step 56 of FIG. 3, the next step in the process is to can the sections, preferably in a vacuum so as to permit the sealing of the can. Thereafter, the cans are heated, preferably in a continuous pressurized rotary cooker for a sufficient time to elevate the center temperature of each can to above 195° Fahrenheit, and at a temperature which is below about 223° Fahrenheit, as is shown in step 58 of FIG. 3. With respect to this temperature range, it has been found through experimentation that processing will vary with the variety and maturity of the fruit and that if the center temperature of the can is not above 195° F., and preferably at least about 200° Fahrenheit, then a tenderizing of the membrane in accordance with the present invention is not effectuated. On the other hand, it has been found that elevation of the center container temperature substantially above 223° Fahrenheit tends to rupture a high percentage of the juice sacs and darkens the product, which tends to destroy the grade of the fruit and its value. Accordingly, it is necessary to reach a temperature between about 200° Fahrenheit to 223° Fahrenheit at the center of the can.

Following this heating step as described above, the containers are then cooled, as shown in step 60 of FIG. 3.

An analysis of grapefruit customarily used for canning purposes indicates that fruit sections processed as set forth above yields a section which maintains the grapefruit's natural juicy plumpness, while establishing a palatable membrane having a strength of substantially less than ten (10) ounces, and usually on the order of three (3) ounces. A membrane having these characteristics is relatively soft, and may be ingested and chewed without a noticeable difference between the membrane and the adjacent portions of the attached juice segments.

I claim:

1. A method for processing grapefruit, having a tough, integral membrane between adjacent fruit segments, said method comprising the steps of:
   removing the peel of grapefruit;
   sectioning or slicing said peeled fruit through fruit segments and between the membranes;
   packing the sections of said fruit in a container;
   elevating the temperature of said container and the fruit therein to a center temperature above 195° F., at a temperature below 223° F., for a sufficient time to tenderize said membrane to a strength of about 10 ounces or less, as measured by an Altek Tensile Tester; and thereafter
   cooling said container.

2. The method recited in claim 1 wherein said container comprises a metal can.

3. A food product made in accordance with the process of claim 1.

* * * * *